(12) United States Patent
Andersson et al.

(10) Patent No.: US 11,281,448 B2
(45) Date of Patent: Mar. 22, 2022

(54) ONLINE FIRMWARE UPGRADE OF A NODE IN A PROCESS CONTROL SYSTEM

(71) Applicant: ABB Schweiz AG, Baden (CH)

(72) Inventors: Staffan Andersson, Lund (SE); Stefan Sallberg, Malmö (SE)

(73) Assignee: ABB Schweiz AG, Baden (CH)

( * ) Notice: Subject to any disclaimer, the term of this patent is extended or adjusted under 35 U.S.C. 154(b) by 73 days.

(21) Appl. No.: 16/800,362

(22) Filed: Feb. 25, 2020

(65) Prior Publication Data
US 2020/0278856 A1    Sep. 3, 2020

(30) Foreign Application Priority Data
Mar. 1, 2019 (EP) .................................. 19160284

(51) Int. Cl.
*G06F 8/65* (2018.01)
*G06F 16/27* (2019.01)

(52) U.S. Cl.
CPC .............. *G06F 8/65* (2013.01); *G06F 16/27* (2019.01)

(58) Field of Classification Search
CPC .............. G06F 8/63; G06F 8/65; G06F 8/656
See application file for complete search history.

(56) References Cited

U.S. PATENT DOCUMENTS

| | | | |
|---|---|---|---|
| 9,639,347 B2* | 5/2017 | Nolterieke | G06F 8/658 |
| 10,114,665 B2 | 10/2018 | Combellas et al. | |
| 2009/0076628 A1* | 3/2009 | Smith | G06F 8/656 700/3 |
| 2014/0013315 A1* | 1/2014 | Genevski | G06F 8/60 717/170 |
| 2017/0168803 A1* | 6/2017 | Katiyar | G06F 11/1433 |
| 2017/0192770 A1* | 7/2017 | Ujiie | G06F 8/654 |
| 2019/0220271 A1* | 7/2019 | Olderdissen | G06F 8/63 |

OTHER PUBLICATIONS

European Extended Search Report Application No. 19160284.6 Completed: Aug. 20, 2019; dated Sep. 9, 2019 8 Pages.

* cited by examiner

*Primary Examiner* — Duy Khuong T Nguyen
(74) *Attorney, Agent, or Firm* — Whitmyer IP Group LLC

(57) ABSTRACT

A node for online firmware upgrade in a process control system includes components. Each component is a separate executable running in a separate operating system process as provided by a real time operating system of the node. A new component is created for each of the components to be upgraded such that each new component is implementing a part of the firmware upgrade corresponding to its component to be upgraded. Each new component is a separate executable running in a separate operating system process. Runtime data is synchronized in each new component with runtime data of its corresponding component to be upgraded. Each component to be upgraded is replaced with its new component.

17 Claims, 14 Drawing Sheets

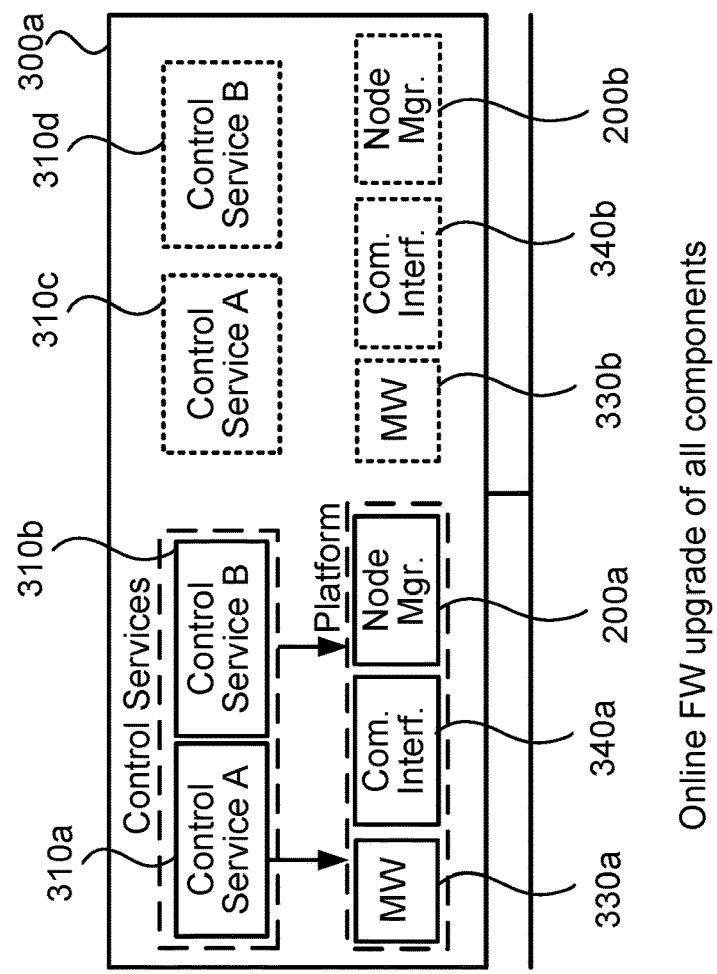
Fig. 5C — Online FW upgrade of all components
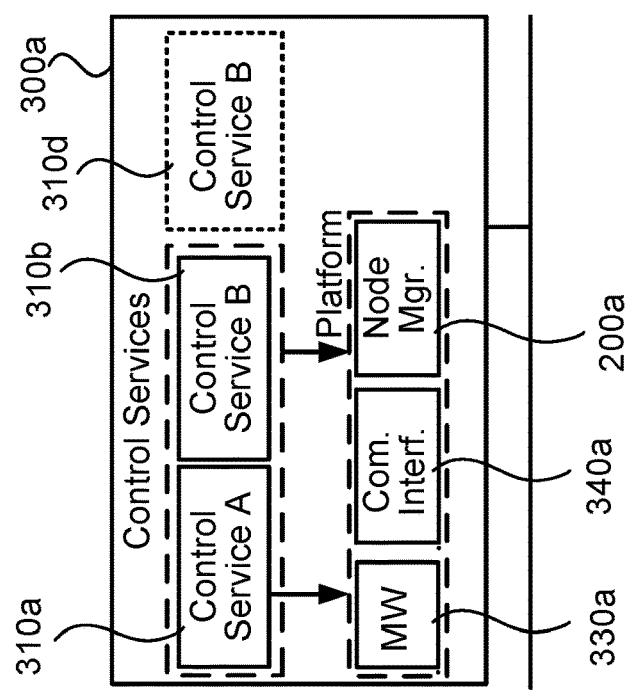
Fig. 5A — Online FW upgrade of control service

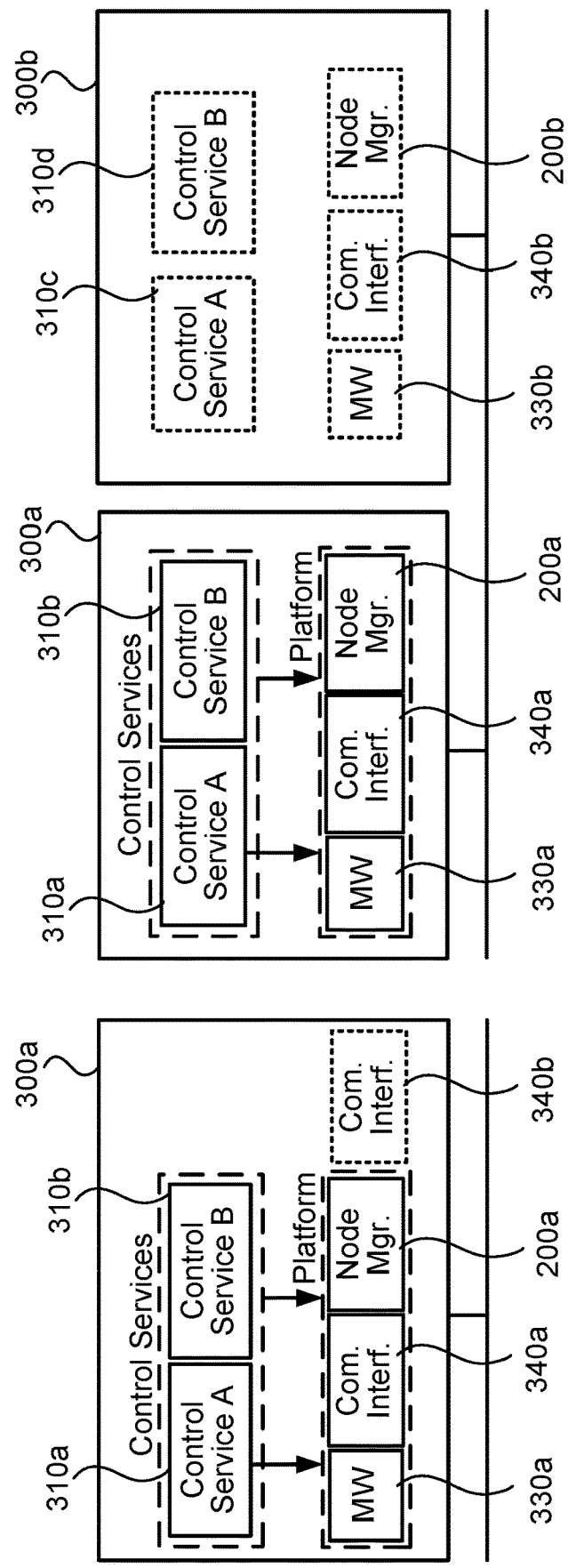

ONLINE FIRMWARE UPGRADE OF A NODE IN A PROCESS CONTROL SYSTEM

TECHNICAL FIELD

Embodiments presented herein relate to a method, a node manager, a computer program, and a computer program product for online firmware upgrade of a node in a process control system.

BACKGROUND

Process control systems of today have a controller centric architecture, i.e. each controller executes a set of control logic applications using input/output (I/O) interfaces and devices connected to the controller, or via fieldbuses connected to the controller. I/O interfaces and devices are configured and scanned by the controller, which makes the controller dependent on knowledge about the hardware topology as well as I/O interface, device and fieldbus specific implementations. Access of I/O interfaces and device data from upper system levels is routed through the controller, and sometimes requires modifications of the control logic.

Process control systems of today require redundant controller hardware, redundant gateway hardware, redundant device hardware etc., to support online firmware upgrade. This has a cost in terms of extra hardware, and sometimes also extra engineering.

During an online firmware upgrade there might be a small unneglectable risk that the new firmware version has an unforeseen and undesirable impact on the control system runtime behavior and dynamics, which in worst case can result in production losses.

Hence, there is still a need for an improved firmware upgrade of process control systems.

SUMMARY

An object of embodiments herein is to provide efficient firmware upgrade of a process control system.

According to a first aspect there is presented a method for online firmware upgrade of a node in a process control system. The node comprises components. Each component is a separate executable running in a separate operating system process as provided by a real time operating system of the node. The method is performed by a node manager of the node to be upgraded. The method comprises creating a new component for each of the at least one of the components to be upgraded such that each new component is implementing a part of the firmware upgrade corresponding to its component to be upgraded, and where each new component is a separate executable running in a separate operating system process. The method comprises synchronizing runtime data in each new component with runtime data of its corresponding component to be upgraded. The method comprises replacing the at least one component to be upgraded with its new component and thereby upgrading the node.

According to a second aspect there is presented a node manager for online firmware upgrade of a node in a process control system. The node manager comprises processing circuitry. The processing circuitry is configured to cause the node manager to perform a method according to the first aspect.

According to a third aspect there is presented a process control system comprising at least one node and node manager according to the second aspect.

According to a fourth aspect there is presented a computer program for online firmware upgrade of a node in a process control system, the computer program comprising computer program code which, when run on a node manager, causes the node manager to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient firmware upgrade of the node in the process control system.

Advantageously this enables online upgrade of the firmware of a singular component or a set of components in non-redundant controllers, gateways, and devices as well as redundant controllers, gateways, and devices.

Advantageously this can be combined with performance evaluation of the new components.

Advantageously, such evaluation of the control system behavior can be used to avoid unforeseen, and undesirable, impacts on the control system runtime behavior and dynamics.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, process block, etc." are to be interpreted openly as referring to at least one instance of the element, apparatus, component, means, module, process block, etc., unless explicitly stated otherwise. The process blocks of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 5A-5D schematically illustrate four use cases for online firmware upgrade according to an embodiment;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any process block or feature illustrated by dashed lines should be regarded as optional.

Figure 1:
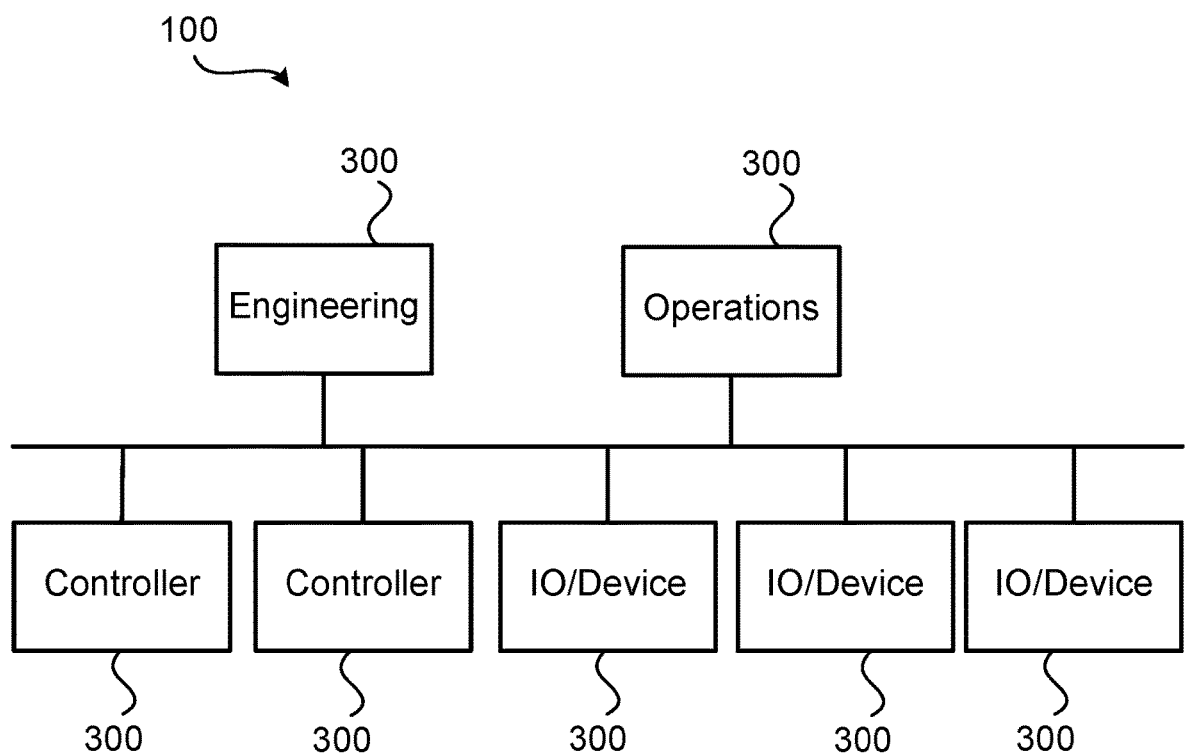
FIG. 1 schematically illustrates a network-centric architecture of a process control system.

In a network-centric architecture of the process control system 100 as illustrated in FIG. 1, input/output (I/O) entities and devices, being examples of nodes 300, are not "owned" by a controller, as in a controller-centric process control system architecture. The engineering tool for I/O entity and device configuration deploys configuration data to the I/O entities and devices without involving a (central) controller. Controllers are focused on execution of control logic and can access I/O signals from any I/O entity or device. The network-centric process control system architecture provides a system-wide easy access to I/O entity information and device information from upper system levels, such as Operations and Engineering, without any routing of information through the controller. The control logic does not have to be updated to access I/O entity information and device information.

In general terms, the exchange of process data between control services is handled by middleware. Data is then represented as signals. The control services represent the principal services in controllers, gateways and devices, e.g. execution of control logic in a controller, scanning of I/O and field devices in a fieldbus gateway, managing the device functionality in a device, etc.

Control services are typically allocated in different nodes, with one or multiple control services per node.

Figure 2:
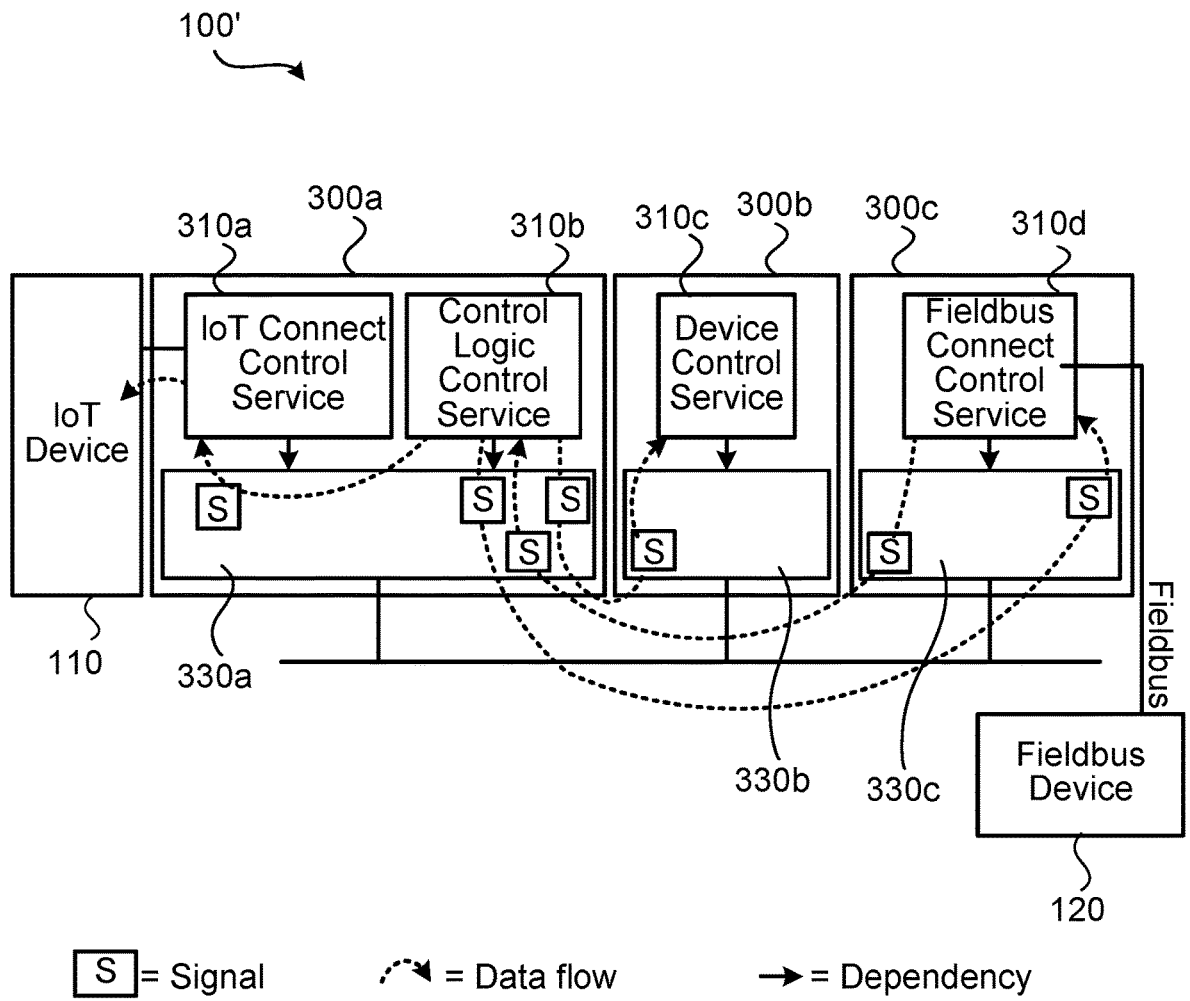
FIG. 2 schematically illustrates control services allocated to different nodes.

In general terms, a control service has no knowledge about where other control services that it interacts with are allocated. This is handled by the middleware and is transparent to the control service. FIG. 2 shows an example of a process control system 100' with four control services 310a, 310b, 310c, 310d executing in three nodes; such as in a node 300b being a device, a node 300c being a fieldbus gateway and a node 300a being a controller, where the node 300a hosts two control services 310a, 310b, where the node 300b hosts one control service 310c, and where the node 300c hosts one control service 310d. Nodes 300a, 300b, and 300c each have a corresponding middleware, such as middleware 330a, 330b and 330c that handle the signal exchange between the control services in the different nodes as well as between control services allocated in the same node (i.e. in the controller 330a in this example).

Interactions with controllers, devices etc. not using middleware, are handled by control services specific for the communication protocol needed for the interaction, as illustrated in FIG. 2. An Internet of Things (IoT) connect control service 310a operatively connects the controller 300a to IoT devices 110, and a fieldbus connect control service 310d of a fieldbus gateway 300c operatively connects the fieldbus gateway to fieldbus devices 120, e.g. Profibus devices. Such control services can execute in any node, e.g. in the controller node, as the IoT connect control service, or in a separate node, as the fieldbus connect control service.

Middleware and control services might be provided as separate executables, running in separate operating system processes, for memory protection and isolation of faults. A control service interacts with middleware through inter process communication.

Control services are configured by a set of engineering tools; one tool for each control service type, e.g. one engineering tool for control logic configuration and another tool for I/O entity configuration and device configuration. This gives an isolation of e.g. control logic engineering from I/O engineering. That is, the control logic can be completely engineered without knowing where it will be executed, or how/where the I/O entities and devices are connected.

Middleware is configured by a middleware configuration component, which uses signal definitions provided by the engineering tools to create the middleware configuration. The middleware configuration is sent with the control service configuration and forwarded to the middleware by the control services.

In general terms, a signal defines a contract/interface between a publisher and a subscriber for the process data to be exchanged. A signal comprises the following attributes: system unique signal identity (ID), data type for the signal value, range and engineering unit for the signal value (for analog signals only), override value (used by the signal subscriber in case of bad quality), and substitute value (used by the signal publisher in case of bad quality). Signals are configured and connected to control logic variables and I/O channels, in the engineering tools for control logic and I/O engineering, and downloaded to the nodes. It is the responsibility of the middleware configuration component to guarantee that the signal IDs are unique within the system.

Existing process control systems require redundant controller hardware, redundant gateway hardware, redundant device hardware, etc., to support online firmware upgrade. This has a cost in terms of extra hardware, and sometimes also extra engineering. Further, during an online firmware upgrade there could be a small unneglectable risk that the new firmware version has an unforeseen and undesirable impact on the control system runtime behavior and dynamics, which in worst case can result in production losses.

The herein disclosed embodiments enable online firmware upgrade of a singular component, or a set of components, in non-redundant controllers, gateways and devices, as well as redundant controllers, gateways and devices. The control system behavior can be evaluated during a control service firmware upgrade to avoid unforeseen and undesirable impact on the control system runtime behavior and dynamics due to the online firmware upgrade. The online firmware upgrade can thus be supervised and evaluated before it is accepted or rejected.

Figure 3:
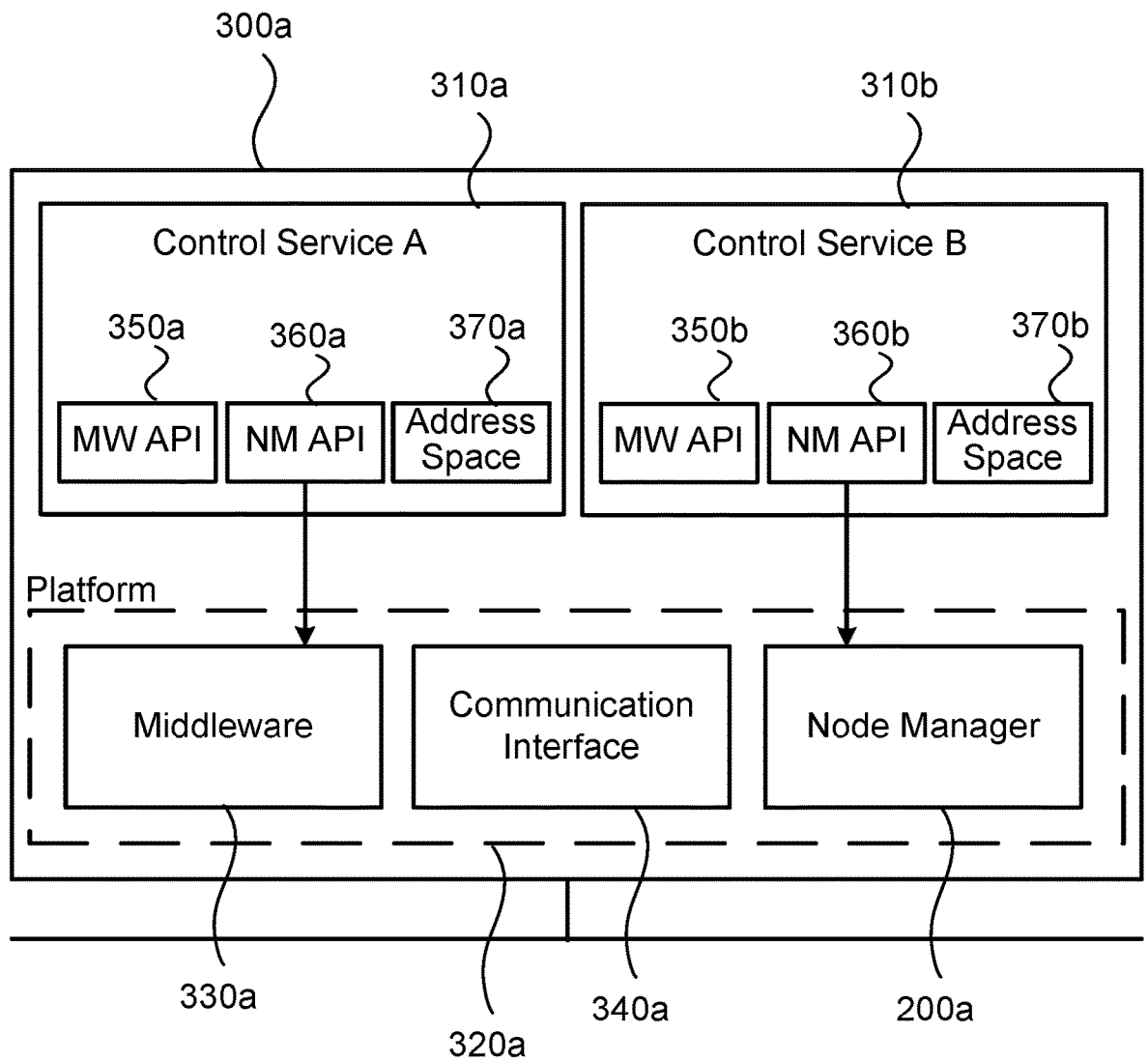
FIG. 3 schematically illustrates a node architecture according to an embodiment.

FIG. 3 schematically illustrates the component architecture for a node 300a in the process control system 100, 100'. In some examples the node 300a is a controller, a gateway, or a process device.

The node 300a has one or multiple control service components 310a, 310b running on a platform component 320a. The platform component 320a comprises the following components: middleware 330a, a node manager 200a, and a communication interface 340a. In some examples the communication interface 340a comprises, or acts as, a vertical communication component.

Each component is a separate executable running in a separate operating system process provided by a real time operating system (not shown in the figure) of the node 300*a*. In some examples the at least one component to be reconfigured is a control service component and/or a platform component 320*a* on which the control service component is running.

Each component might comprise middleware 330*a* for signal exchange that makes it possible for, for example, any control service to access any signal in any other control service without knowledge of network layout, control service deployment, or control service internals.

The middleware 330*a* makes it possible to move a signal publisher from one node 300*a* to another node without affecting the subscribers, and vice versa.

To simplify the control service implementation and to harmonize the control services behavior, each control service component 310*a*, 310*b* is provided with three subcomponents; middleware (MW) application programming interface (API) 350*a*, 350*b*, node manager (NM) API 360*a*, 360*b*, and an address space 370*a*, 370*b* to be used in the control service interactions with the platform component 320*a*. These subcomponents can also be copied to be part of the platform components. That is, in some examples the control service component comprises a middleware API, a node manager API, and an address space.

Each component has its own database for runtime and configuration data. That is, there is no separate component acting as a central database used by all components. The component runtime database is optimized for the most frequent data accesses, e.g. for control logic execution and allows control services to have a specific information model, e.g. IEC 61131-3 information model with program organization units (POUs), variables, etc. Information not needed by other components is hidden inside the control service. In this respect, the database might be provided as anything that is configured to store data such as a traditional database, a class, a table, or any other type of suitable data structure.

The node manager 200*a* is configured for the startup of all components in the node 300, and for supervision of the runtime behavior, health, etc. for the components. The node manager 200*a* might be configured to, depending on its configuration, stop or restart execution of components.

The node manager 200*a* is configured for performing the online firmware upgrade in the node 300*a*.

As each component is a separate executable and as each component has its own database for runtime and configuration data, singular components as well as the complete set of components in a node 300*a* can be upgraded without requiring a redundant hardware of the node 300*a*. Hence, in some aspects the real time operating system runs on non-redundant hardware in the node 300*a*. However, online upgrade of the real time operating system generally requires redundant hardware. That is, in other aspects the real time operating system runs on redundant hardware in the node 300*a*.

The example embodiments disclosed herein in particular relate to mechanisms for online firmware upgrade of a node 300*a* in a process control system 100, 100'. In order to obtain such mechanisms there is provided a node manager 200, a method performed by the node manager 200*a*, a computer program product comprising code, for example in the form of a computer program, that when run on a node manager 200*a*, causes the node manager 200*a* to perform the method.

Figure 4A:
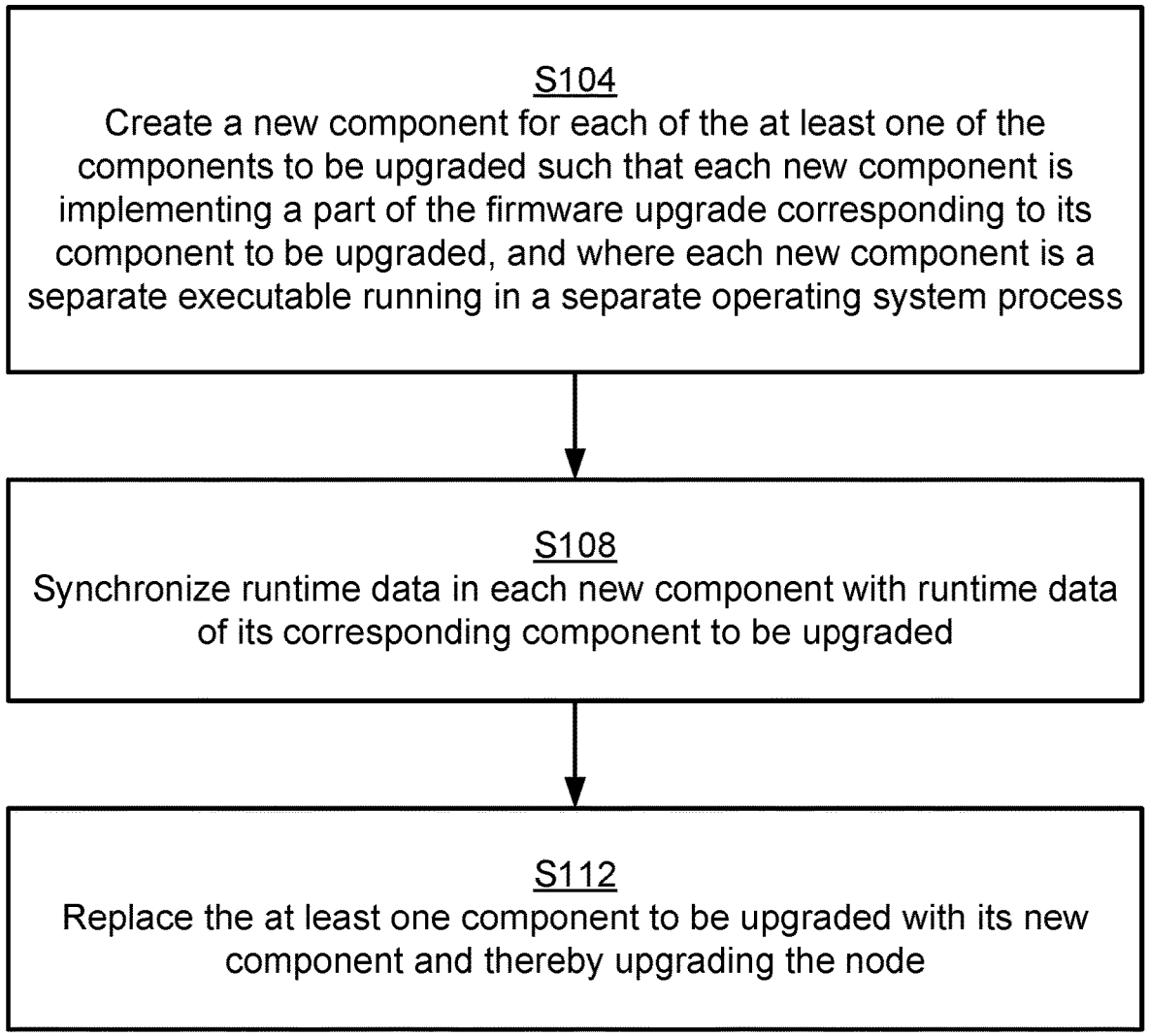
FIGS. 4A and 4B are flowcharts of methods according to embodiments.

FIG. 4A illustrates, in accordance with the exemplary aspects of the disclosure, a method for online firmware upgrade of a node 300*a* in a process control system 100, 100', wherein the node 300*a* comprises components, where each component is a separate executable running in a separate operating system process as provided by a real time operating system of the node 300*a*. In an exemplary embodiment, the method is performed by a node manager 200*a* of the node 300*a* to be reconfigured. The method is advantageously provided as a computer program 1020.

The process starts in process block 104, by creating a new component for each of the at least one of the components to be upgraded such that each new component is implementing a part of the firmware upgrade corresponding to its component to be upgraded, and where each new component is a separate executable running in a separate operating system process, as further described below and in greater detail in conjunction with below figures.

Next, in process block S108, runtime data in each new component is synchronized with runtime data of its corresponding component to be upgraded, as further described below and in greater detail in conjunction with below figures.

Next, in process block S112, the at least one component to be upgraded is replaced with its new component and thereby upgrading the node 300*a*, as further described below and in greater detail in conjunction with below figures.

Figure 4B:
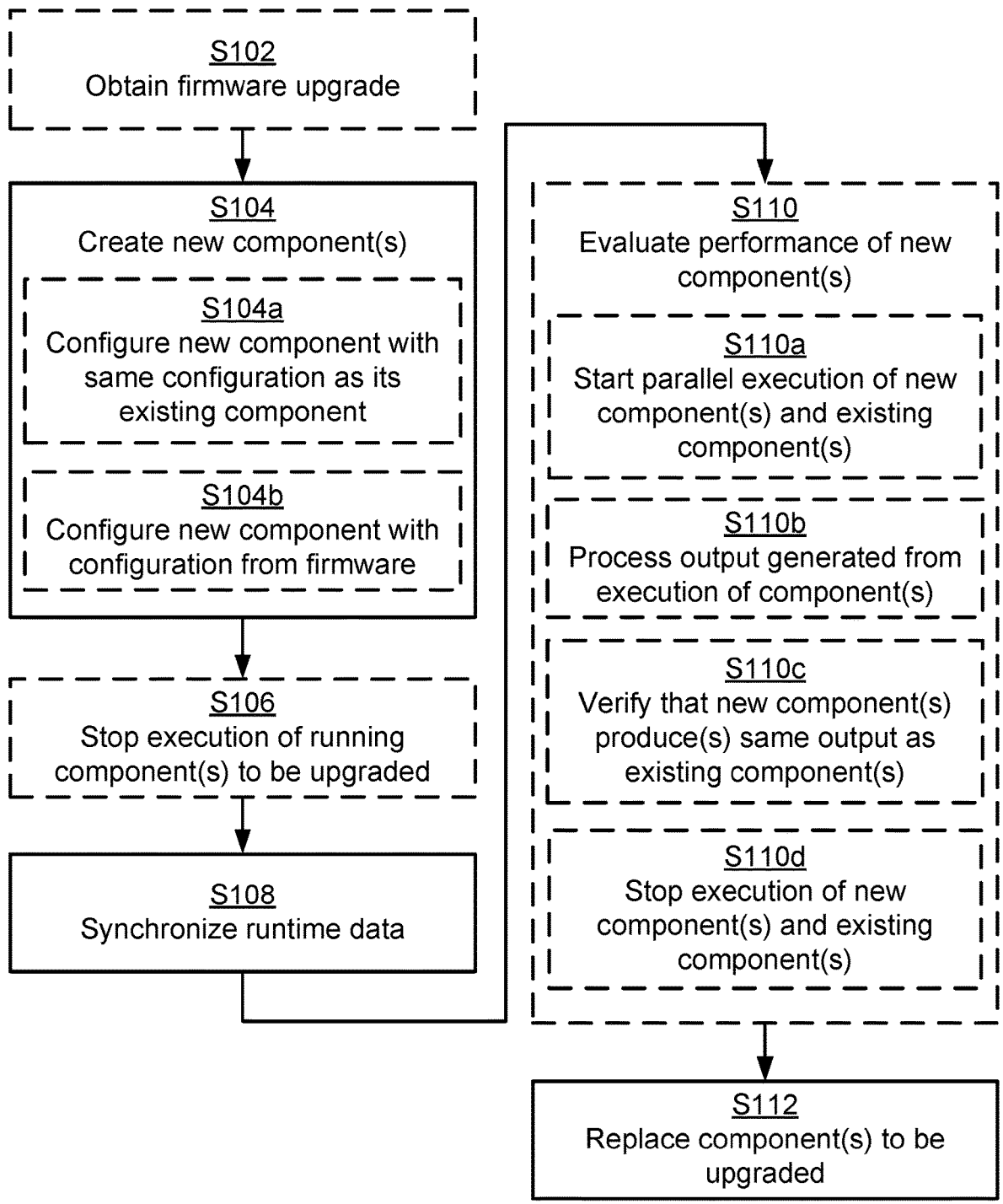

FIG. 4B is a flowchart illustrating further embodiments of methods for online firmware upgrade of a node 300 in a process control system 100, 100' shown in FIG. 4A. Referring to FIG. 4B, the node 300*a* comprises components. Each component is a separate executable running in a separate operating system process as provided by a real time operating system of the node 300*a*. In an exemplary embodiment, the methods are performed by the node manager 200*a*. The methods are advantageously provided as computer programs 1020.

In general terms, there are four use cases for the methods; 1) online firmware upgrade of a singular control service of the node 300, 2) online firmware upgrade of a singular platform component 320 of the node 300, 3) online firmware upgrade of all components of the node 300, and 4) online firmware upgrade of the complete firmware using redundant hardware. The use cases are illustrated in FIGS. 5A-5D, where use case 1 is illustrated at FIG. 5A, use case 2 is illustrated at FIG. 5B, use case 3 is illustrated at FIG. 5C, and use case 4 is illustrated at FIG. 5D, In FIGS. 5A-5D, dotted lines are used to identify any component 200*b*, 310*c*, 310*d*, 330*b*, 340*b* to be upgraded, and where the redundant hardware is defined by node 300*b*. The formulation "firmware upgrade of at least one component" will be used when no differentiation needs to be made between these use cases. In the first two use cases at FIGS. 5A and 5B, the firmware of a singular component 200*b*, 310*c*, 310*d*, 330*b*, 340*b* is upgraded. Upgrade of the firmware of a singular component requires that the new component (resulting from the firmware upgrade) is compatible with the remaining existing components in the node 300. If this is not the case, the third use case at FIG. 5C where the firmware of all components is upgraded. In the fourth use case FIG. 5D redundant hardware as defined by node 300*b* is used, which might be required for online upgrade of the firmware of the real time operating system and the node manager 200*a*.

The firmware upgrade might be orchestrated from a firmware upgrade tool. The firmware upgrade tool might thus be used to transfer new firmware to the node 300*a*, and for sending upgrade commands during the upgrade process as defined by below process blocks S102-S112. The node manager 200*a* is thus the receiver of the upgrade commands and the new firmware and is configured to execute the upgrade commands by performing the method according to below process blocks S102-S112. Hence, according to an embodiment the node manager 200a is configured to perform (optional) process block S102.

S102: The node manager 200a obtains a firmware upgrade for at least one of the components of the node 300a.

The node manager 200a uses the firmware upgrade to create new component executable(s) in parallel with the component executable(s) to be upgraded. That is, the node manager 200a is configured to perform process block S104.

S104: The node manager 200a creates a new component for each of the at least one of the components to be upgraded such that each new component is implementing a part of the firmware upgrade corresponding to its component to be upgraded. Each new component is a separate executable running in a separate operating system process. Each operating system process might be provided by the real time operating system of the node 300a. The new component is created whilst the at least one of the components to be reconfigured is still running.

The new component(s) are configured using the same configuration files as was used when configuring the old version. In case the old configuration file format is not compatible with the new firmware version, new configuration files are transferred with the new firmware. That is, according to an embodiment, each new component, when being created, is configured with same configuration as its corresponding component to be upgraded, and according to another embodiment, each new component, when being created, is configured with configuration as provided by the firmware upgrade.

The node manager 200a might then stop the execution of all component(s) to be upgraded. That is, according to an embodiment the node manager 200a is configured to perform (optional) process block S106.

S106: The node manager 200a stops execution of each component to be upgraded and running on the node 300a.

The node manager 200a then starts the synchronization of runtime data in the new component(s) with runtime data from the old component(s). That is, the node manager 200a is configured to perform process block S108.

S108: The node manager 200a synchronizes runtime data in each new component with runtime data of its corresponding component to be upgraded.

Figure 6A:
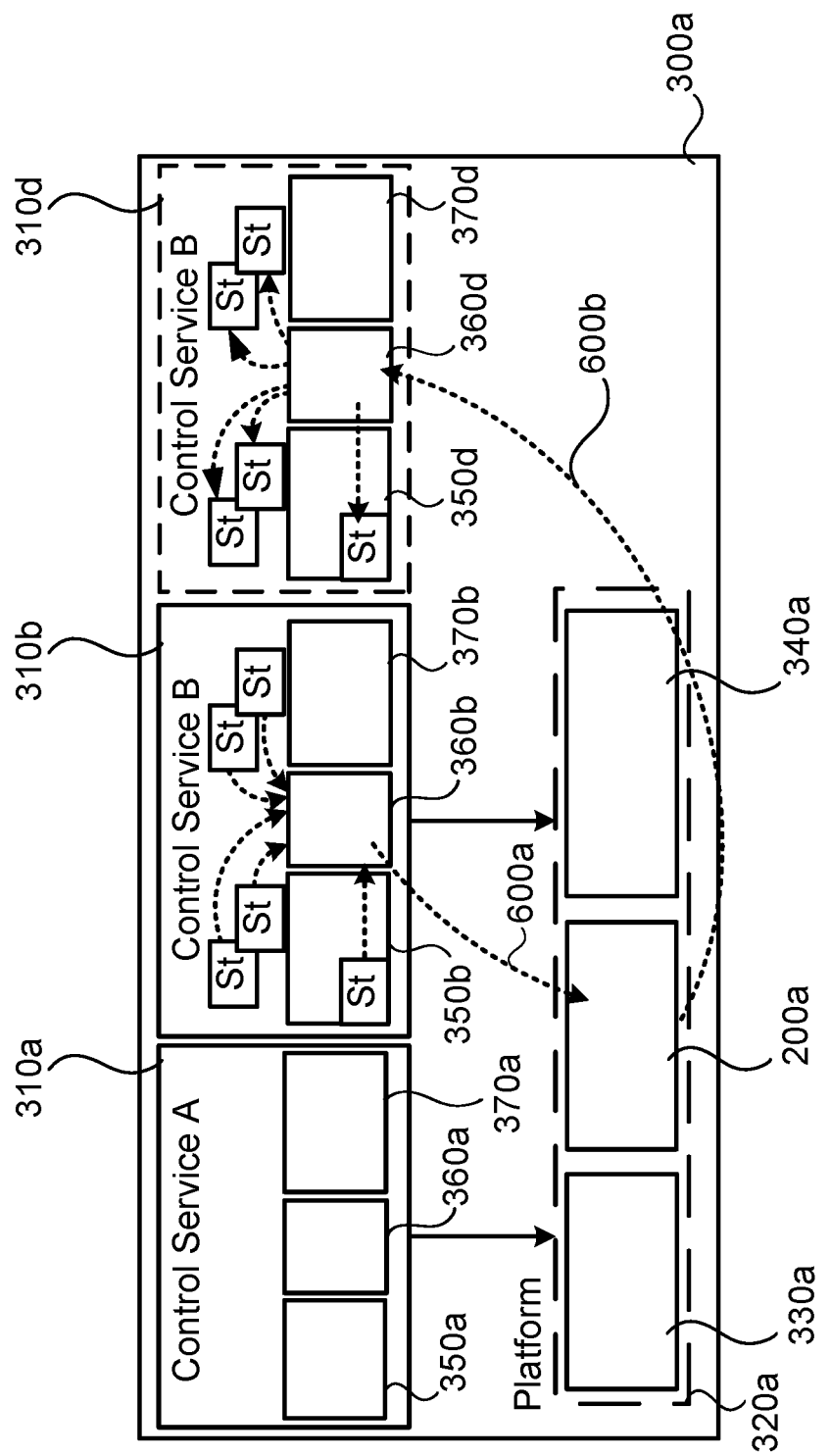
FIGS. 6A-6B schematically illustrate synchronization of runtime data according to an embodiment.
Figure 6B:
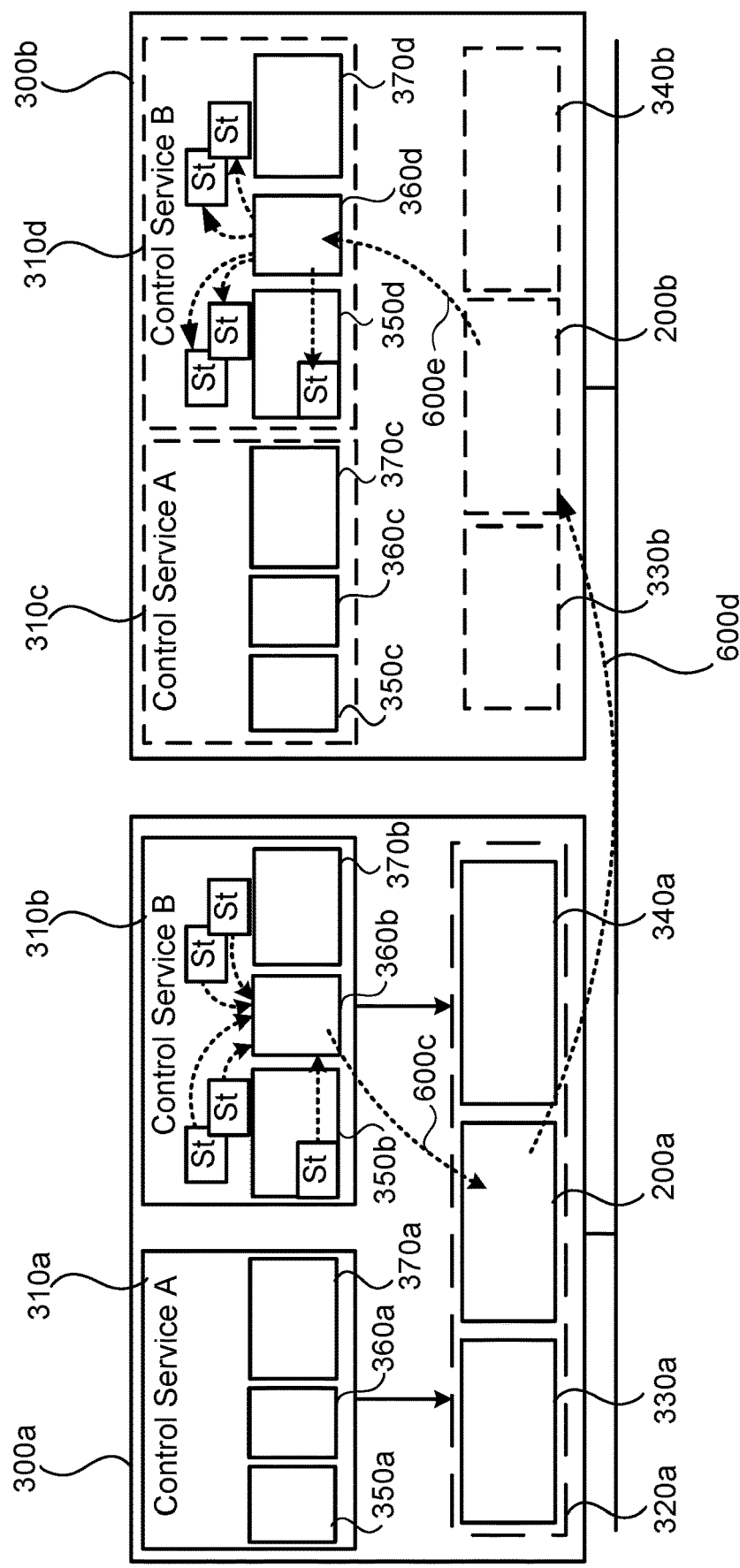

The synchronization is schematically illustrated in FIGS. 6A-6B. FIG. 6A illustrates use cases 1 and 2 and FIG. 6B illustrates use cases 3 and 4. Thus, node 300a in FIG. 6A comprises the same components as node 300a of FIG. 5A and in addition explicitly shows the subcomponents 350a, 350b, 360a, 360b, 370a, 370b of control services 310a, 310b. FIG. 6A also shows subcomponents 350d, 360d, 370d corresponding to subcomponents of control service 310d in FIG. 5A. Further, node 300a in FIG. 6B comprises the same components as node 300a of FIG. 5D and in addition explicitly shows the subcomponents 350a, 350b, 360a, 360b, 370a, 370b of control services 310a, 310b. FIG. 6B also shows the corresponding subcomponents 200a, 310c, 310d, 330b, 340b, 350c, 350d, 360c, 360d, 370c, 370d of node 300b in FIG. 5D.

In use cases 1 and 2 all control logic variables etc. that contains states that must be retained, are collected and submitted to the node manager API 360b subcomponent, which packages them into a container and forwards them to the node manager 200a, as symbolically illustrated by arrow 600a. The node manager 200a sends them to the node manager API 360d in the new component 310d, as symbolically illustrated by arrow 600b, where they are used for update of the runtime data.

In use cases 3 and 4 the collected states are submitted to the node manager 200, as symbolically illustrated by arrow 600c, which packages and forwards them, as symbolically illustrated by arrow 600d, to the new node manager 200b, which forwards them to the other new components, for update of the runtime data, as symbolically illustrated by arrow 600e. To simplify the figure, collection and update of states are only shown for one component; for control Service B. The transferred states have a version independent representation in the container to enable state transfer although the component internal state representations differ between the new and existing component versions.

After completed synchronization, the node manager 200a starts the new component(s), and deletes the old component (s). In use case 4, this is done through a switch over to the passive hardware unit (defined by node 300b), initiated by the node manager 200a. That is, the node manager 200a is configured to perform process block S112.

S112: The node manager 200a replaces the at least one component to be upgraded with its new component and thereby upgrades the node 300a. In some aspects the node manager 200 upgrades the node 300a by starting execution of each new component upon having deleted the at least one component to be upgraded.

Embodiments relating to further details of online firmware upgrade of a node 300a in a process control system 100, 100' as performed by the node manager 200a will now be disclosed.

To avoid unforeseen and undesirable impact on the control system runtime behavior and dynamics due to the online firmware upgrade, in some aspects there is provided a mechanism for evaluation of the control system behavior during the firmware upgrade. In some aspects performance evaluation is performed by the firmware upgrade tool. In other aspects the performance evaluation is performed internally in the node. Hence, according to an embodiment, the node manager 200a is configured to perform (optional) process block S110.

S110: The node manager 200a evaluates performance of each new component after synchronizing the runtime data but before deleting the at least one component to be upgraded.

The evaluation is performed after the synchronization in process block S108.

Both the new component and the existing component to be upgraded are started and run in parallel. Hence, according to an embodiment, the node manager 200a is configured to perform (optional) process block S110a as part of process block S110.

S110a: The node manager 200a starts parallel execution of each new component and the at least one component to be upgraded. Each new component and the at least one component to be upgraded are thus run in parallel. Each new component and the at least one component to be upgraded are run with same input, but only output produced by running the at least one component to be upgraded with the input is used in the process control system 100, 100'. That is, only the existing component controls the outputs.

Potential differences in runtime behavior and dynamics for one or multiple components can thereby be evaluated. In some aspects the firmware upgrade tool verifies that the new component has acceptable behavior, and thus performs as expected, by verifying that the new component produces expected output (for the given input). In other aspects verification is performed internally in the node. In particular, according to an embodiment, the node manager 200 is configured to perform (optional) process block S110b as part of process block S110.

S110b: The node manager 200a verifies that each new component produces expected output.

Once this has been verified the execution is stopped. In particular, according to an embodiment, the node manager 200 is configured to perform (optional) process block S110c as part of process block S110.

S110c: The node manager 200a, based on the verifying, stops execution of each new component and the at least one component to be upgraded. In other words, the execution is stopped upon the firmware upgrade tool, or the node manager 200a, having verified that each new component produces the same output as its corresponding component to be upgraded.

In case the firmware upgrade tool, or the node manager 200a, cannot verify that each new component produces the expected output the online firmware upgrade process is aborted. In case of abortion each new component is deleted and operation of the node 300a is continued using the corresponding component(s) that was/were to be upgraded.

As will be further disclosed below, according to an embodiment, each new component is, via the node manager 200a, provided with the input from its corresponding component to be upgraded.

In some aspects, differences due to firmware upgrade of platform components cannot be evaluated. That is, according to an embodiment, the evaluating in processing block S110 is only performed when it is the firmware of the control service component that is to be upgraded. Hence, in view of the above, the evaluation might be performed for any of above use cases 1, 3 and 4.

Once it has been verified that the new firmware version, as resulting from the firmware upgrade, operates as expected, the new component can be set to active, i.e. being the component that e.g. controls the outputs of the node 300a and is accessed through the namespace of the new component. In use case 4, this is implemented through a switch, initiated by the node manager 200a, over to the hardware unit (defined by node 300b) running the new component.

In a similar way as the node manager 200a and the node manager API 360a handle the synchronization of runtime data in the control services, the node manager 200a and the node manager API 360a handle the synchronization of the component inputs as well as synchronization of the component execution.

In the startup of the new component, the new component subscribes to input signals and registers its output signals in the middleware (using the middleware API), thereby enabling a fast switch to the new component. However, the new component will not use the received signals during the evaluation and will not publish its signals to the middleware 330a, which during the evaluation are blocked by middleware API. Instead the new component will use input signals received from the existing component. The middleware API and the address space in the existing component forwards all received inputs to the node manager API, which packages them into a version independent container and submits them to the node manager 200a which forwards them to the node manager API in the new component, which makes them available to the middleware API.

Figure 7A:
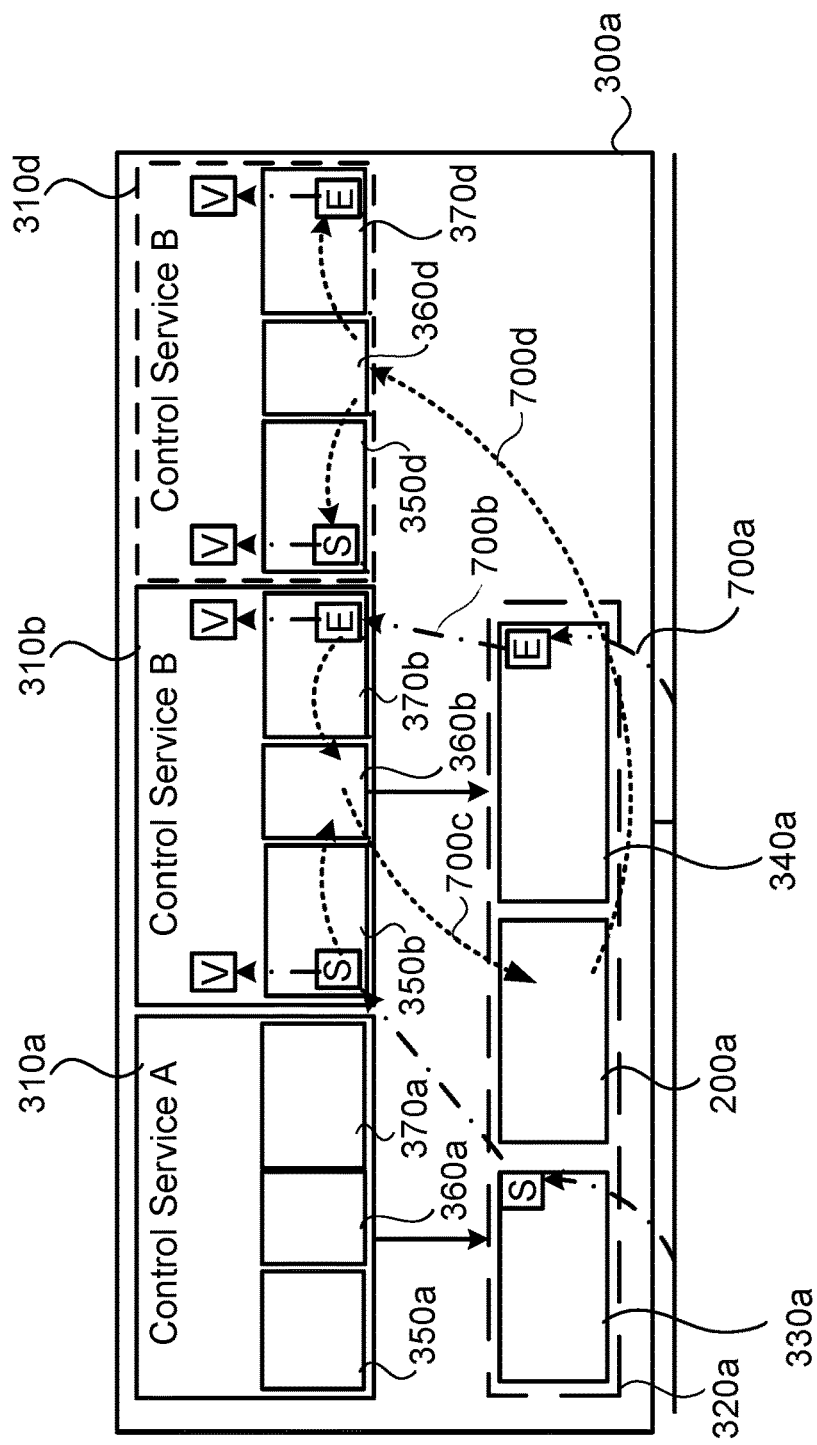
FIGS. 7A-7B schematically illustrate synchronization of input data according to an embodiment.
Figure 7B:
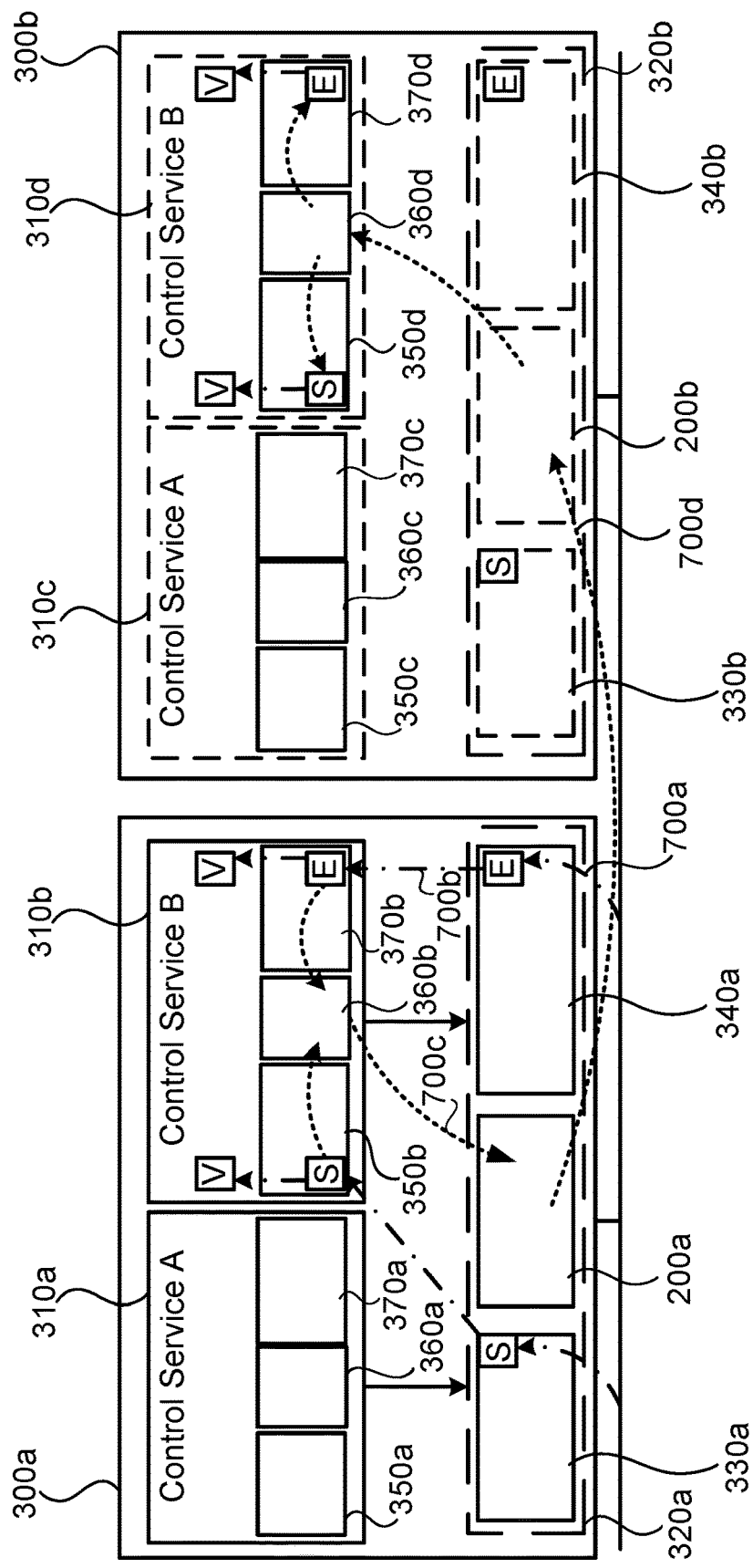

FIGS. 7A and 7B illustrate synchronization of input data for use case 1 (at FIG. 7A) and case 4 (at FIG. 7B). The figures do not show all the details, e.g. that subscribed signals are received by both component versions (i.e., existing and new). FIG. 7A illustrates a node 300a having identical components as node 300a in FIG. 6A. FIG. 7B illustrates nodes 300a, 300b having identical components as nodes 300a, 300b in FIG. 6B.

Other types of input data e.g. from communication with upper system parts, from an I/O scanner or from a communication stack are also synchronized. Input data from upper system parts are received as symbolically shown by arrow 700a by the communication interface 340a which forwards it to the address space 370b in the existing component as symbolically shown by arrow 700b. The address space 370b sends the input data to the node manager API 360b which forwards it to the new component as symbolically shown by arrows 700c, 700d. Other input data e.g. received by an I/O scanner in a component, is sent by the existing component to the new component using the node manager API 360. In case the new component is e.g. an I/O scanner, it will not control the I/O and devices during the evaluation. This is handled by the existing component.

Figure 8A:
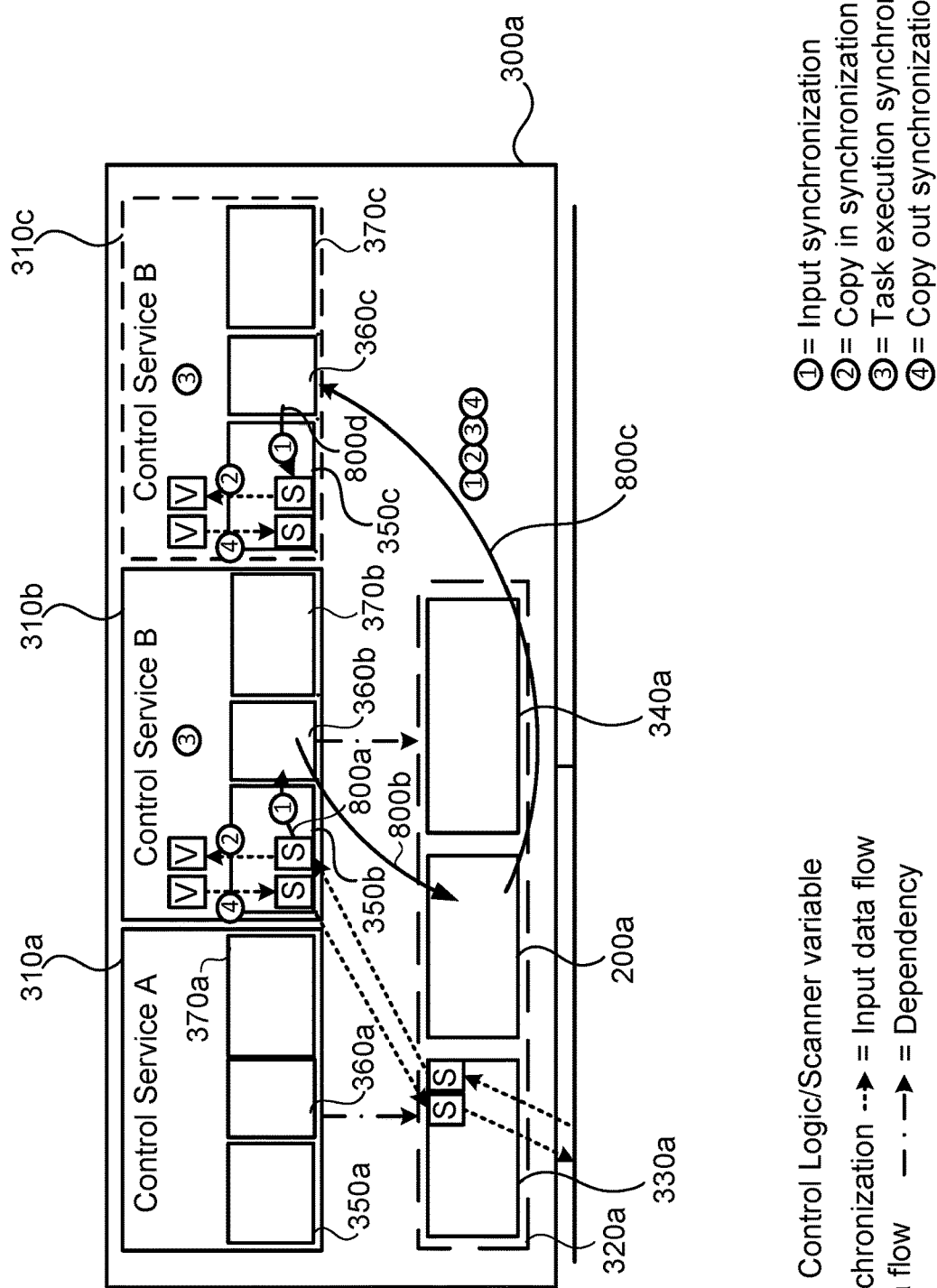
FIGS. 8A-8B schematically illustrate synchronization of execution according to an embodiment.
Figure 8B:
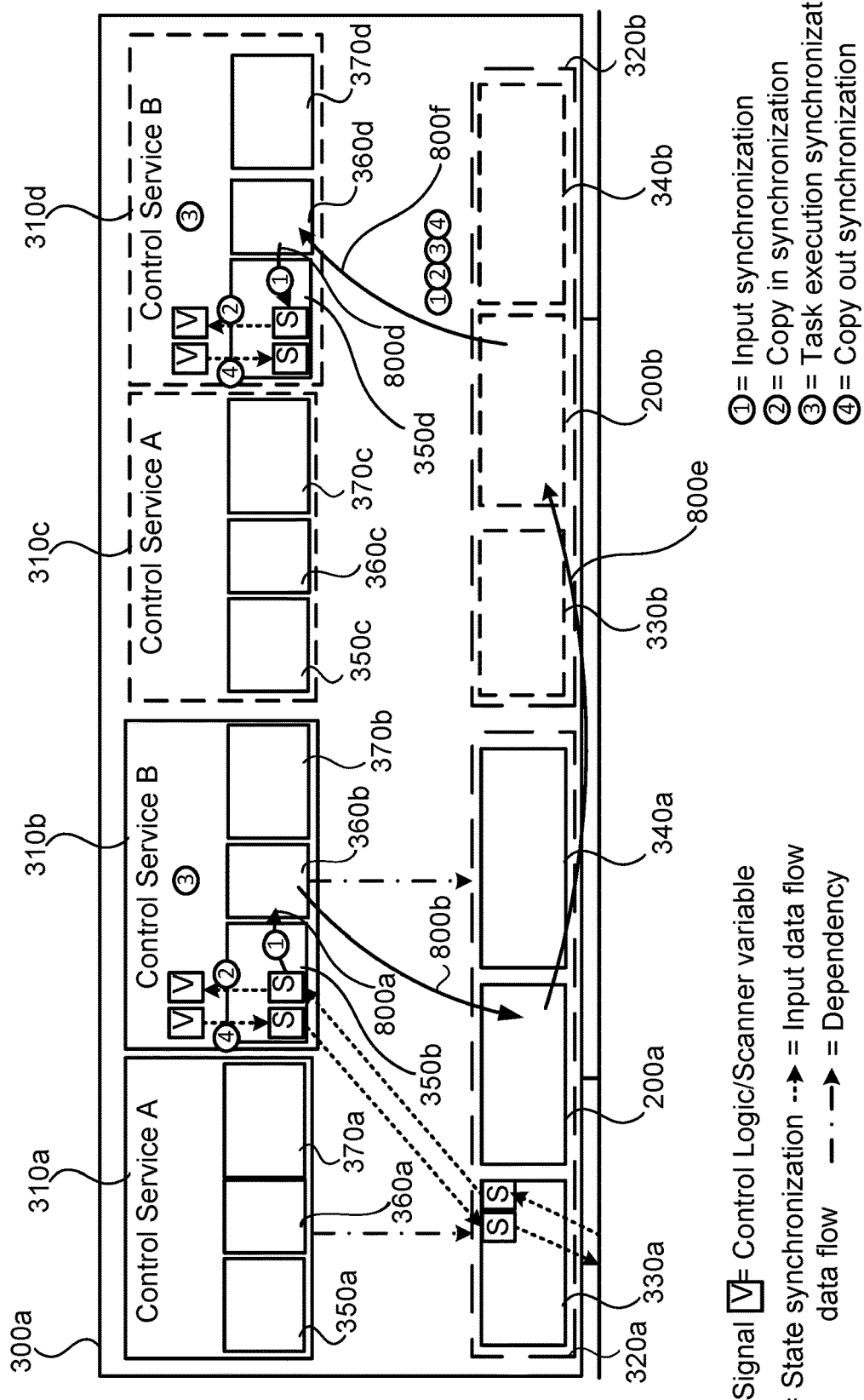

The executions of the component to be upgraded are synchronized, i.e. synchronization of input data as described above, copying signal values to internal variables, executing the control or scanner logic etc., and copying internal variable values to the signals. In this respect, the middleware API 350 triggers the synchronization (e.g. copy-in, execute, copy-out, input data sync) using the node manager API 360, which forwards the synchronization information using the infrastructure as described above. This is illustrated by arrows 800a, 800b, 800c, 800d, 800e, 800f in FIGS. 8A and 8B for use case 1 (at FIG. 8A) and case 3 (at FIG. 8B). FIG. 8A illustrates a node 300a having identical components as node 300a in FIG. 7A. FIG. 8B illustrates nodes 300a, 300b having identical components as nodes 300a, 300b in FIG. 7B.

As the existing component and the new component expose the same entities in address space, the new component in some aspects uses a separate namespace, an evaluation namespace, for its entities. Hence, according to an embodiment, a temporary namespace is used for each new component when evaluating the performance in process block S110. For example, a specific control logic variable will have the same item ID in the existing component as in the new component, but different namespace IDs. However, the separate evaluation namespace is not needed in use case 4 since the existing component and the new component are running in different nodes 300a.

The communication interface 340a, 340b subcomponent can be used to read control logic or I/O scanner variables values, signal values etc. The firmware upgrade tool might be configured to evaluate potential differences in runtime behavior and dynamics, by reading values from both namespaces, the ordinary namespace and the evaluation namespace. The firmware upgrade tool uses the namespace ID to identify which component (i.e., the existing component or the new component) to request for the value. The address space 370a-370e of the requested control service uses the item ID to find the corresponding entity.

A control service has no knowledge about where its control service communication partners are allocated. Therefore, a control service that publishes a data set (a group of signals) can be replaced by another control service in the same node 300a or in a different node 300a without affecting the subscriber(s) of the data set, and a control service that subscribes to a data set can be replaced by another control service in the same node 300a or in a different node 300a without affecting the publisher of the data set.

Figure 9:
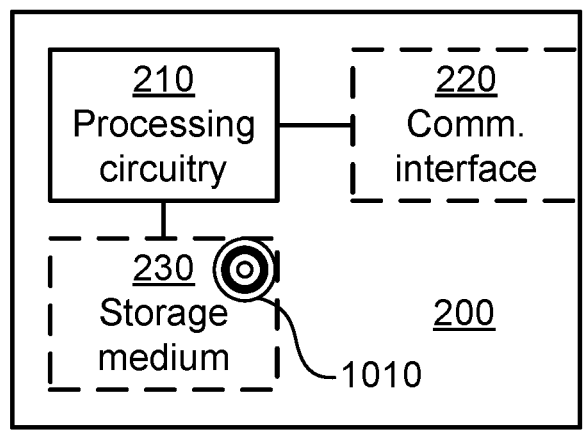
FIG. 9 is a schematic diagram showing functional units of a node manager according to an embodiment.

FIG. 9 schematically illustrates, in terms of a number of functional units, the components of a node manager 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the node manager 200a to perform a set of operations, or process blocks, as disclosed above. For example, the storage medium 230 may store the set of operations, and the processing circuitry 210 may be configured to retrieve the set of operations from the storage medium 230 to cause the node manager 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The node manager 200a may further comprise a communications interface 220 at least configured for communications with other components of the node. As such the communications interface 220 may comprise one or more transmitters and receivers, comprising analogue and digital components. The processing circuitry 210 controls the general operation of the node manager 200a e.g. by sending data and control signals to the communications interface 220 and the storage medium 230, by receiving data and reports from the communications interface 220, and by retrieving data and instructions from the storage medium 230. Other components, as well as the related functionality, of the node manager 200a are omitted in order not to obscure the concepts presented herein.

As disclosed above, the node manager 200a might be provided as a component of a node 300a and may hence share resources, such as processing circuitry 210, etc. with the node 300a as needed.

Figure 10:
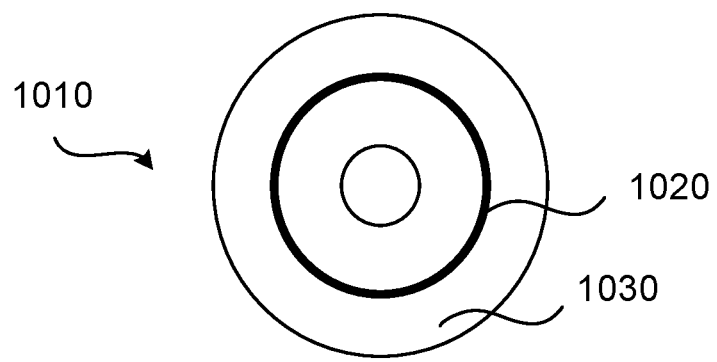
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any process blocks as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for online firmware upgrade of a node in a process control system, wherein the node comprises components, where each component is a separate executable running in a separate operating system process as provided by a real time operating system of the node, the method being performed by a node manager of the node to be upgraded, the method comprising the steps of:
   creating a new component for each of the at least one of the components to be upgraded such that each new component is implementing a part of the firmware upgrade corresponding to its component to be upgraded, and where each new component is a separate executable running in a separate operating system process, wherein each new component, when being created, is configured with same configuration as its corresponding component to be upgraded or is configured with configuration as provided by the firmware upgrade;
   synchronizing runtime data in each new component with runtime data of its corresponding component to be upgraded; and
   replacing the at least one component to be upgraded with its new component and thereby upgrading the node.

2. The method according to claim 1, wherein the real time operating system runs on non-redundant hardware in the node.

3. The method according to claim 1, further comprising:
   evaluating performance of each new component after synchronizing the runtime data but before deleting the at least one component to be upgraded.

4. The method according to claim 3, wherein evaluating the performance comprises:
   starting parallel execution of each new component and the at least one component to be upgraded, wherein each new component and the at least one component to be upgraded are run with same input, but wherein only output produced by running the at least one component to be upgraded with the input is used in the process control system;
   verifying that each new component produces expected output; and
   stopping, based on the verifying, execution of each new component and the at least one component to be upgraded.

5. The method according to claim 4, wherein each new component is, via the node manager, provided with the input from its corresponding component to be upgraded.

6. The method according to claim 5, wherein a temporary namespace is used for each new component when evaluating the performance.

7. The method according to claim 4, wherein a temporary namespace is used for each new component when evaluating the performance.

8. The method according to claim 4, wherein the at least one component to be upgraded is at least one of a control service component and a platform component on which the control service component is running, and wherein the evaluating is only performed when it is the firmware of the control service component that is to be upgraded.

9. The method according to claim 3, wherein a temporary namespace is used for each new component when evaluating the performance.

10. The method according to claim 3, wherein the at least one component to be upgraded is at least one of a control service component and a platform component on which the control service component is running, and
wherein the evaluating is only performed when it is the firmware of the control service component that is to be upgraded.

11. The method according to claim 3, wherein the control service component comprises a middleware API, a node manager API, and an address space, and
wherein the evaluating is only performed when it is the firmware of the control service component that is to be upgraded.

12. The method according to claim 1, wherein the at least one component to be upgraded is at least one of a control service component and a platform component on which the control service component is running.

13. The method according to claim 12, wherein the control service component comprises a middleware API, a node manager API, and an address space.

14. The method according to claim 12, wherein the platform component comprises middleware, the node manager, and a communication interface.

15. The method according to claim 1, further comprising:
stopping execution of each component to be upgraded and running on the node after having created the new component and before synchronizing the runtime data.

16. A node manager for online firmware upgrade of a node in a process control system, wherein the node comprises components, where each component is a separate executable running in a separate operating system process as provided by a real time operating system of the node, the node manager having processing circuitry, the processing circuitry being configured to cause the node manager to perform a method according to claim 1.

17. A computer program product for online firmware upgrade of a node in a process control system, the computer program product comprising a computer program and a non-transitory computer readable storage medium on which the computer program is stored, wherein the node comprises components, where each component is a separate executable running in a separate operating system process as provided by a real time operating system of the node, the computer program having computer code which, when run on processing circuitry of a node manager, causes the node manager to perform a method according to claim 1.

* * * * *